US005753352A

United States Patent [19]

Vanmaele et al.

[11] Patent Number: 5,753,352

[45] Date of Patent: May 19, 1998

[54] LAMINATED SECURITY DOCUMENT CONTAINING FLUORESCENT DYE GIVING LIGHT PIPING

[75] Inventors: Luc Vanmaele, Lochristi; Wilhelmus Janssens, Aarschot; Leon Vermeulen, Herenthout, all of Belgium

[73] Assignee: Agfa-Gevaert, N.V., Mortsel, Belgium

[21] Appl. No.: 747,669

[22] Filed: Nov. 12, 1996

[30] Foreign Application Priority Data

Nov. 23, 1995 [EP] European Pat. Off. .............. 95203216

[51] Int. Cl.$^6$ .............................. B32B 3/00; B42D 15/00

[52] U.S. Cl. ............................ 428/204; 428/76; 428/203; 428/916; 283/109; 283/110; 283/902

[58] Field of Search .............................. 428/76, 203, 204, 428/207, 690, 913, 916; 283/107–112, 902

*Primary Examiner*—Alexander Thomas
*Attorney, Agent, or Firm*—Breiner & Breiner

[57] ABSTRACT

The present invention provides a security document comprising (1) a laminate comprising two laminating elements serving as support and covering element and (2) an information carrier laminated between the laminating elements, at least one laminating element comprising two transparent or translucent plastic sheets serving as outer resin layer and inner resin layer characterized in that in the said at least one laminating element comprising an outer resin layer and an inner resin layer a fluorescent dye is comprised between said outer resin layer and said inner resin layer, said fluorescent dye giving light piping in said laminating element containing said fluorescent dye when irradiated with light having a wavelength between 200 and 1000 nm.

11 Claims, No Drawings

LAMINATED SECURITY DOCUMENT CONTAINING FLUORESCENT DYE GIVING LIGHT PIPING

FIELD OF THE INVENTION

The present invention relates to security documents that can be verified on their authenticity and are protected against counterfeiting by photo-copying.

BACKGROUND OF THE INVENTION

Security documents that must be verifiable on their authenticity are e.g. all kinds of identification documents such as passports, visas, identity cards, driver licenses, bank cards, credit cards, and security entrance cards.

Nowadays, by the availability of markedly improved black-and-white and color copiers it becomes more and more easy to copy documents at high quality hardly to distinguish from the originals.

To protect the above mentioned documents against fraudulent alterations and reproduction by photo-copying different techniques are used such as the melt-laminating or glueing thereto of preprinted plastic overlayers; the printing with special inks; the application of coatings or layers for example loaded with magnetic or fluorescent pigments; coloring or metallizing the substrate of the documents; incorporating holograms; applying fine line printing, watermarks, fibers, security threads, light diffraction marks, liquid crystal marks and/or substances called nacreous, iridiscent or interference pigments.

Many of these techniques require the need for specialized devices or conditions to verify the document on its authenticity making it a cumbersome operation.

SUMMARY OF THE INVENTION

It is an object of the present invention to provide a security document comprising a laminate and containing a verification feature that can not be copied by photographic techniques and wherein there is no need for specialized devices or conditions to verify the document on its authenticity.

It is a particular object of the present invention to provide a security document comprising a laminate and containing at least one overall image or pattern providing special effects that can not be copied photographically.

It is a special object of the present invention to provide a security document comprising a laminate and a layer including personal data with or without an image that allow easy verfication by the naked eye of the security document involved.

Further objects of the present invention will become clear from the description hereinafter.

According to the present invention there is provided a security document comprising (1) a laminate comprising two laminating elements serving as support and covering element and (2) an information carrier laminated between the laminating elements, at least one laminating element comprising two transparent or translucent plastic sheets serving as outer resin layer and inner resin layer characterized in that in the said at least one laminating element comprising an outer resin layer and an inner resin layer a fluorescent dye is comprised between said outer resin layer and said inner resin layer, said fluorescent dye giving light piping in said laminating element containing said fluorescent dye when irradiated with light having a wavelength between 200 and 1000 nm.

DETAILED DESCRIPTION OF THE INVENTION

By "transparent or translucent plastic sheet" in the document according to the present invention has to be understood a plastic sheet having a visible light-blocking capacity less than 80%, preferably less than 50%, more preferably less than 20%, not being excluded plastic sheets that are inherently colored or have obtained a color by incorporation of colorants.

By "inner resin layer" of a laminating element comprising an inner and an outer resin layer is meant the resin layer which after lamination is contiguous to the information carrier. The "outer resin layer" is then the layer of said laminating element which after lamination becomes an outside layer of said security document.

Preferred fluorescent dyes have the following structure

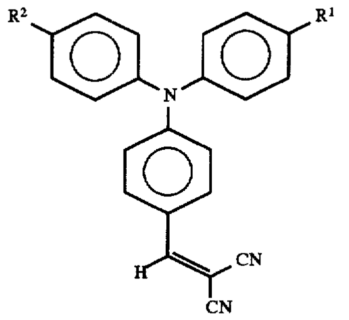

Formula I wherein $R^1$ and $R^2$ independently represent hydrogen, halogen, an alkyl group, an aryl group, an alkoxy group or a thioalkoxy group. More preferably $R^1$ and $R^2$ represent the same group, most preferably hydrogen.

Said fluorescent dyes are easily prepared by a number of methods. For example said fluorescent dyes are prepared by reaction of the starting amine under anhydrous conditions with a di-alkylformamide in the presence of a condensing agent such as $POCl_3$, and then reacting the anhydrous solution of the intermediate so formed, preferably in the presence of an acid acceptor, with malononitrile. More details about methods for preparing said fluorescent dyes are given in the literature e.g. in U.S. Pat. No. 3,247,211; U.S. Pat. No. 3,917,604; U.S. Pat. No. 4,006,178 and U.S. Pat. No. 4,180,663.

For easy visual verification the fluorescent dye according to the invention is present preferably in a coverage of 0.01 g/m$^2$ to 10 g/m$^2$, more preferably in a coverage of 0.5 g/m$^2$ to 2.0 g/m$^2$ in the above mentioned laminating element.

One laminating element can be a single layer of an organic resin e.g. cellulose acetate film, poly(vinyl acetal) film, polystyrene film, polycarbonate film, or poly(ethylene terephthalate) film.

A preferred laminating element is made of a vinyl chloride polymer.

The term "vinyl chloride polymer" used herein includes the homopolymer, as well as any copolymer containing at least 50% by weight of vinyl chloride units and including no hydrophilic recurring units.

Vinyl chloride copolymers serving as the laminating element may contain one or more of the following comonomers: vinylidene chloride, vinyl acetate, acrylonitrile, styrene, butadiene, chloroprene, dichlorobutadiene, vinyl fluoride, vinylidene fluoride and trifluorochloroethylene.

The polyvinyl chloride serving as a laminating element may be chlorinated to contain 60–65% by weight of chlorine.

Many properties of polyvinyl chloride and its copolymers are improved by plasticization and their stability can be improved by stabilizers well known to those skilled in the art (see, e.g., F. W. Billmeyer, Textbook of Polymer Chemistry, Interscience Publishers, Inc., New York (1957) p. 311–315)).

The polyvinyl chloride laminating element may contain pigments or dyes as colouring matter e.g. in an amount up to 5% by weight. An opaque white appearance may be obtained by incorporation of white pigments, e.g. titanium dioxide particles.

One laminating element is according to a preferred embodiment a polyvinyl chloride support having a thickness of only 0.050 to 0.75 mm. A sheet of that thickness can still be manipulated easily in a mechanical printing process, e.g. offset or intaglio printing, and can receive security or verification marks in the form of e.g. a watermark, finger prints, printed patterns known from bank notes, coded information, e.g. binary code information, signature or other printed personal data or marks that may be applied with liquid crystals, fluorescent pigments, nacreous pigments giving special light-reflection effects, and/or visibly legible or ultraviolet-legible printing inks as described e.g. in GB-P 1,518,946 and U.S. Pat. No. 4,105,333.

Further security features are infrared-absorbing markings, mildly radioactive isotope patterns, magnetic dots or strips and electronic microcircuits hidden from visibility.

At least one of the laminating elements and preferably both of the laminating elements comprises an outer resin layer and an inner resin layer, at least one of said laminating elements and optionally both of the laminating elements when both comprise an outer resin layer and an inner resin layer comprising a fluorescent dye according to the invention between said outer resin layer and said inner resin layer.

Said outer resin layer can be any transparent or translucent organic resin e.g. cellulose acetate film, poly(vinyl acetal) film, polystyrene film, polycarbonate film or polyvinyl chloride film. Preferably said outer resin layer is a poly(ethylene terephthalate) film, more preferably an oriented poly(ethylene terephthalate) film.

Said inner resin layer can be any transparent or translucent melt-adhesive layer comprising an organic resin having a lower glass transition temperature ($T_g$) and melting temperature ($T_m$) than the outer resin layer. Preferably the glass transition temperature of the resin comprised in the inner resin layer is at least 20° C., more preferably at least 40° C. lower than the glass transition temperature of the resin comprised in the outer resin layer. Most preferably said inner resin layer is a polyalkylene layer, particularly preferably a polyethylene layer. In this connection reference is made to the Tg values of polyethylene, polypropylene, polyvinyl chloride and polyethylene terephthalate being −20° C., +5° C., +80° C. and +67° C. respectively (see J. Chem. Educ., Vol. 61, No. 8, August 1984, p. 668).

The fluorescent dye according to the invention can be present in said laminating element homogeneous covering the total surface of the laminating element or preferably as marks.

Said fluorescent dye is preferably applied in such a way that it does not interfere with information on the information carrier. In one embodiment a security document comprises an information carrier comprising an opaque support and carrying information at only one side of said information carrier. The fluorescent dye is then preferably present homogeneously in the laminating element of said laminate which is applied at that side of the information carrier not carrying information. In another embodiment said fluorescent dye is present as a mark or marks at spots not carrying specified security or verification marks. Said specified security or verification marks are e.g. a watermark, finger prints, printed patterns known from bank notes and coded information, e.g. binary code information.

Said fluorescent dye when covering the total surface of the laminating element will be applied to the outer resin layer of the laminating element by coating techniques operating with a coating liquid containing said fluorescent dye in dispersed or dissolved form. After coating the solvent or dispersing liquid, e.g. water, is removed by evaporation. Any coating technique for the application of thin liquid layers may be used as is known e.g. from the field of the manufacture of photographic silver halide emulsion layer materials, e.g. doctor blade coating, gravure roller coating, meniscus coating, air knife coating, slide hopper coating and spraying.

According to a special embodiment a fluorescent dye according to the invention is applied in the form of a dye-transfer-foil wherefrom by hot transfer the dye is transferred uniformly or in pattern form onto the outer resin layer of the laminating element.

Still another coating technique suited for uniformly applying said dye is by dry powder-spraying optionally on a hot-melt resin layer wherein it is impregnated by pressure and heat. Spray-coating may be applied for covering the whole laminating element or only a part thereof.

Said fluorescent dye can be used for dying a commercial coating varnish which may then be used for pre-coating an outer resin layer of a laminating element. The coating may proceed with common varnishing or impregnation machinery instead of using printing presses.

The image-wise or pattern-wise application of said fluorescent dye proceeds by printing with an ink containing said dye. Suited printing processes are e.g. planographic offset printing, gravure printing, intaglio printing, screen printing, flexographic printing, relief printing, tampon printing, ink jet printing and toner-transfer printing from electro(photo) graphic recording materials.

After applying said fluorescent dye the outer resin layer and the inner resin layer of said at least one laminating element comprising an outer resin layer and an inner resin layer are bound to one laminating element by applying between said outer resin and said inner resin a glue e.g. a two-component polyurethane glue in a way well known to the people skilled in the art.

The information carrier comprises a transparent or translucent or opaque support and carries optical information.

The opaque support is e.g. an opaque paper support or resin coated paper support, e.g. polyolefin coated paper and polyethylene coated paper of which the polyethylene layer may contain opacity providing pigments such as white $TiO_2$ particles as described e.g. in EP-A 324 192.

Other opaque supports that may be used are resin supports containing in their resin mass dispersed white pigments, e.g. $TiO_2$, or are such resin supports that contain said pigments dispersed in the resin mass in the presence of light-straying microvoids as described e.g. in EP 349152. Organic resins used for manufacturing said supports, e.g. by extrusion, are polycarbonate, polyester, preferably poly(ethylene terephthalate) or poly(ethylene naphthalate), poly (methylacrylaat-styrene-acrylonitrile), poly (acrylonitrile-butadiene-styrene), polyamides, polyethersulfones, polyetherketones, polystyrene, poly-Alpha-olefins such as polypropylene or polyethylene, polyvinyl acetals and homo- and copolymers of vinyl chloride. Further are mentioned cellulose esters e.g. cellulose triacetate.

Transparent or translucent supports may be transparent or translucent organic resins e.g. the resins cited above. Preferred transparent or translucent supports are films of polyesters such as poly(ethylene terephthalate) or of poly-Alpha-olefins such as polyethylene.

The optical information can be applied directly on the support of the information carrier by printing techniques. Suitable printing processes are e.g. planographic offset printing, gravure printing, intaglio printing, screen printing, flexographic printing, relief printing, tampon printing, ink jet printing, laser printing, thermal transfer printing, dye diffusion thermal transfer printing and toner-transfer printing from electro(photo)graphic recording materials.

On said support and/or on one or both of the laminating elements can be applied security or verification marks in the form of e.g. a watermark, finger prints, printed patterns known from bank notes, coded information, e.g. binary code information, signature or other printed personal data or marks or layers that may be applied with liquid crystals, fluorescent pigments, nacreous pigments giving special light-reflection effects, and/or visibly legible or ultraviolet-legible printing inks as described e.g. in GB-P 1,518,946 and U.S. Pat. No. 4,105,333.

The optical information can also be applied on a hydrophilic colloid layer coated on the support of the information carrier by a photographic method and/or by printing.

According to a preferred embodiment said hydrophilic colloid layer is an imagewise exposed and processed (developed and fixed) silver halide emulsion layer or is an image-receiving layer containing a photographic image obtained by the silver complex diffusion transfer reversal process or is an image-receiving layer containing a mordant for dyes set free in a dye diffusion transfer process based on silver halide photography.

In accordance with a first photographic mode a black-and-white photograph in the form of a silver image is formed by the silver salt diffusion transfer process, called herein DTR-process. According to said process dissolved silver halide salt is transferred imagewise in a special image receiving layer, called development nuclei containing layer, for reducing therein transferred silver salt.

The principles of the DTR-process are described in U.S. patent Ser. No. 2,352,014 of André Rott, issued Jun. 20, 1944. According to said process silver complexes are image-wise transferred by diffusion from a silver halide emulsion layer to an image-receiving layer, where they are converted, in the presence of development nuclei, into a silver image. For this purpose, an image-wise exposed silver halide emulsion layer is developed by means of a developing substance in the presence of a so-called silver halide solvent. In the exposed parts of the silver halide emulsion layer the silver halide is developed to metallic silver so that it cannot dissolve anymore and consequently cannot diffuse. In the non-exposed parts of the silver halide emulsion layer the silver halide is converted into soluble silver complexes by means of a silver halide complexing agent, acting as silver halide solvent, and said complexes are transferred by diffusion into an image-receiving layer being in waterpermeable contact with said emulsion layer to form by the catalytic action of said development nuclei, in so-called physical development, a silver-containing image in the image-receiving layer.

The DTR-image can be formed in the image receiving layer of a sheet or web material which is a separate element with respect to the photographic silver halide emulsion material (a so-called two-sheet DTR element) or in the image receiving layer of a so-called single-support-element, also called mono-sheet element, which contains at least one photographic silver halide emulsion layer integral with an image receiving layer in waterpermeable relationship therewith. It is the first two-sheet version which is preferred for the preparation of the information carrier by the DTR method.

The DTR process can be utilized for reproducing line originals e.g. printed documents, as well as for reproducing continuous tone originals, e.g. portraits.

By the fact that the DTR-image is based on diffusion transfer of imaging ingredients the image-receiving layer and optionally present covering layer(s) have to be water-permeable.

A first method of reproducing images by the DTR process is by making a raster image using a screen and an emulsion with a steep gradient, which method is very well known to the people skilled in the art.

A second method is by making a continuous tone image. The reproduction of black-and-white continuous tone images by the DTR-process requires the use of a recording material capable of yielding images with considerable lower gradient than is normally applied in document reproduction to ensure the correct tone rendering of continuous tones of the original. In document reproduction silver halide emulsion materials are used which normally mainly contain silver chloride. Silver chloride not only leads to a more rapid development but also to high contrast.

In U.S. Pat. No. 3,985,561, to be read in conjunction herewith, a light-sensitive silver halide material is described wherein the silver halide is predominantly chloride and this material is capable of forming a continuous tone image on or in an image-receiving material by the diffusion transfer process.

According to said U.S. patent a continuous tone image is produced by the diffusion transfer process in or on an image-receiving layer through the use of a light-sensitive layer which contains a mixture of silver chloride and silver iodide and/or silver bromide dispersed in a hydrophilic colloid binder e.g. gelatin, wherein the silver chloride is present in an amount of at least 90 mole % based on the total mole of silver halide and wherein the weight ratio of hydrophilic colloid to silver halide, expressed as silver nitrate, is between 3:1 and about 10:1 by weight.

With these light-sensitive materials successful reproduction of continuous tone images can be obtained probably as a result of the presence of the indicated amounts of silver iodide and/or silver bromide and of the defined high ratio of hydrophillic colloid to silver halide.

According to U.S. Pat. No. 4,242,436 likewise to be read in conjunction herewith, the reproduction of continuous tone images can be improved by developing the photographic material with a mixture of developing agents comprising an o-dihydroxybenzene, e.g. catechol, a 3-pyrazolidone e.g. a 1-aryl-3-pyrazolidone and optionally a p-dihydroxybenzene, e.g. hydroquinone, the molar amount of the o-dihydroxybenzene in said mixture being larger than the molar amount of the 3-pyrazolidone, and the p-dihydroxybenzene if any being present in a molar ratio of at most 5% with respect to the o-dihydroxybenzene.

Suitable development nuclei for use in the above mentioned physical development in the image receiving layer are e.g. noble metal nuclei e.g. silver, palladium, gold, platinum, sulphides, selenides or tellurides of heavy metals such as Pd, Ag, Ni and Co. Preferably used development nuclei are colloidal PdS, $Ag_2S$ or mixed silver-nickelsulphide particles. The amount of nuclei used in the image receiving layer is preferably between 0.02 mg/m$^2$ and 10 mg/m$^2$.

The image receiving layer comprises for best imaging results the physical development nuclei in the presence of a protective hydrophilic colloid, e.g. gelatin and/or colloidal silica, polyvinyl alcohol etc..

The transfer behaviour of the complexed silver largely depends on the thickness of the image-receiving layer and the kind of binding agent or mixture of binding agents used in the nuclei containing layer. In order to obtain a sharp image with high spectral density the reduction of the silver salts diffusing into the image receiving layer must take place rapidly before lateral diffusion becomes substantial. An image-receiving material satisfying said purpose is described in U.S. Pat. No. 4,859,566.

An image-receiving material of this type is very suitable for use in connection with the present invention and contains a water-impermeable support coated with (1) an image-receiving layer containing physical development nuclei dispersed in a waterpermeable binder and (2) a waterpermeable top layer free from development nuclei and containing a hydrophilic colloid, in such a way that:

(i) the total solids coverage of said two layers (1) and (2) is e.g. at most 2 $g/m^2$, (ii) in layer (1) the coverage of the nuclei is in the range of 0.1 $mg/m^2$ to 10 $mg/m^2$, and the coverage of binder is in the range of 0.4 to 1.5 $g/m^2$, and (iii) in said top layer (2) the coverage of hydrophilic colloid is in the range of 0.1 to 0.9 $g/m^2$.

The coating of said layers proceeds preferably with slide hopper coater or curtain coater known to those skilled in the art.

According to a particular embodiment the nuclei containing layer (1) is present on a nuclei-free underlying hydrophilic colloid undercoat layer or undercoat layer system having a coverage in the range of 0.1 to 1 $g/m^2$ of hydrophilic colloid, the total solids coverage of layers (1) and (2) together with the undercoat being at most 2 $g/m^2$.

The undercoat optionally incorporates substances that improve the image quality, e.g. incorporates a substance improving the image-tone or the whiteness of the image background. For example, the undercoat may contain silver complexing agent(s) and/or development inhibitor releasing compounds known for improving image sharpness.

According to a special embodiment the image-receiving layer (1) is applied on an undercoat playing the role of a timing layer in association with an acidic layer serving for the neutralization of alkali of the image-receiving layer. By the timing layer the time before neutralization occurs is established, at least in part, by the time it takes for the alkaline processing composition to penetrate through the timing layer. Materials suitable for neutralizing layers and timing layers are disclosed in Research Disclosure July 1974, item 12331 and July 1975, item 13525.

In the image-receiving layer (1) and/or in said top layer (2) and/or in an alkali-neutralizing undercoat gelatin is used preferably as hydrophilic colloid. In layer (1) gelatin is present preferably for at least 60% by weight and is optionally used in conjunction with an other hydrophilic colloid, e.g. polyvinyl alcohol, cellulose derivatives, preferably carboxymethyl cellulose, dextran, gallactomannans, alginic acid derivatives, e.g. alginic acid sodium salt and/or watersoluble polyacrylamides. Said other hydrophilic colloid may be used also in the top layer for at most 10% by weight and in the undercoat in an amount lower than the gelatin content.

The image-receiving layer and/or a hydrophilic colloid layer in water-permeable relationship therewith may comprise a silver halide developing agent and/or silver halide solvent, e.g. sodium thiosulphate in an amount of approximately 0.1 g to approximately 4 g per $m^2$.

The image-receiving layer or a hydrophilic colloid layer in water-permeable relationship therewith may comprise colloidal silica.

The image-receiving layer may contain as physical development accelerators, in operative contact with the developing nuclei, thioether compounds such as those described e.g. in DE-A 1,124,354; U.S. Pat. No. 4,013,471; U.S. Pat. No. 4,072,526 and in EP-A 26520.

According to a preferred embodiment the processing liquid and/or the DTR image-receiving material contains at least one image toning agent. In said case the image toning agent(s) may gradually transfer by diffusion from said image-receiving material into the processing liquid and keep therein the concentration of said agents almost steady. In practice such can be realized by using the silver image toning agents in a coverage in the range from 1 $mg/m^2$ to 20 $mg/m^2$ in a hydrophilic waterpermeable colloid layer.

A survey of suitable toning agents is given in the below mentioned book of André Rott and Edith Weyde, p. 61–65, preference being given to 1-phenyl-1H-tetrazole-5-thiol, also called 1-phenyl-5-mercapto-tetrazole, tautomeric structures and derivatives thereof such as 1-(2,3-dimethylphenyl)-5-mercapto-tetrazole, 1-(3,4-dimethylcyclohexyl)-5-mercapto-tetrazole, 1-(4-methylphenyl)-5-mercapto-tetrazole, 1-(3-chloro-4-methylphenyl)-5-mercapto-tetrazole, 1-(3,4-dichlorophenyl)-5-mercapto-tetrazole. Further particularly useful toning agents are of the class of thiohydantoins and of the class of phenyl substituted mercapto-triazoles. Still further toning agents suitable for use in accordance with the preferred embodiment of the present invention are the toning agents described in EP-A 218752, 208346, 218753 and U.S. Pat. No. 4,683,189.

The above mentioned DTR image-receiving materials may be used in conjunction with any type of photosensitive material containing a silver halide emulsion layer. For continuous tone reproduction the silver halide comprises preferably a mixture of silver chloride, and silver iodide and/or silver bromide, at least 90 mole % based on the total mole of the silver halide being silver chloride, and the ratio by weight of hydrophillic colloid to silver halide expressed as silver nitrate is preferably between 3:1 and 10:1.

The binder for the silver halide emulsion layer and other optional layers contained on the imaging element is preferably gelatin. But instead of or together with gelatin, use can be made of one or more other natural and/or synthetic hydrophilic colloids, e.g. albumin, casein, zein, polyvinyl alcohol, alginic acids or salts thereof, cellulose derivatives such as carboxymethyl cellulose, modified gelatin, e.g. phthaloyl gelatin etc. The weight ratio in the silver halide emulsion layer of hydrophilic colloid binder to silver halide expressed as equivalent amount of silver nitrate to binder is e.g. in the range of 1:1 to 10:1, but preferably for continuous tone reproduction is between 3.5:1 and 6.7:1.

The silver halide emulsions may be coarse or fine grain and can be prepared by any of the well known procedures e.g. single jet emulsions, double jet emulsions such as Lippmann emulsions, ammoniacal emulsions, thiocyanate- or thioether-ripened emulsions such as those described in U.S. Pat. Nos. 2,222,264, 3,320,069, and 3,271,157. Surface image emulsions may be used or internal image emulsions may be used such as those described in U.S. Pat. Nos. 2,592,250, 3,206,313, and 3,447,927. If desired, mixtures of surface and internal image emulsions may be used as described in U.S. Pat. No. 2,996,382.

The silver halide particles of the photographic emulsions may have a regular crystalline form such as cubic or octahedral form or they may have a transition form. Regular-grain emulsions are described e.g. in J. Photogr. Sci., Vol. 12, No. 5, September/October 1964, pp. 242–251. The silver halide grains may also have an almost spherical form or they may have a tabular form (so-called T-grains), or may have composite crystal forms comprising a mixture of regular and irregular crystalline forms. The silver halide grains may have a multilayered structure having a core and shell of different halide composition. Besides having a differently composed core and shell the silver halide grains may comprise also different halide compositions and metal dopants inbetween.

The number average size expressed as the number average diameter of the silver halide grains may range from 0.2 to 1.2 µm, preferably between 0.2 µm and 0.8 µm, and most preferably between 0.3 µm and 0.6 µm. The size distribution can be homodisperse or heterodispere. A homodisperse size distribution is obtained when 95% of the grains have a size that does not deviate more than 30% from the average grain size.

The emulsions can be chemically sensitized e.g. by adding sulphur-containing compounds during the chemical ripening stage e.g. allyl isothiocyanate, allyl thiourea, and sodium thiosulphate. Also reducing agents e.g. the tin compounds described in BE-A 493,464 and 568,687, and polyamines such as diethylene triamine or derivatives of aminomethane-sulphonic acid can be used as chemical sensitizers. Other suitable chemical sensitizers are noble metals and noble metal compounds such as gold, platinum, palladium, iridium, ruthenium and rhodium. This method of chemical sensitization has been described in the article of R. KOSLOWSKY, Z. Wiss. Photogr. Photophys. Photochem. 46, 65–72 (1951).

The emulsions can also be sensitized with polyalkylene oxide derivatives, e.g. with polyethylene oxide having a molecular weight of 1000 to 20,000, or with condensation products of alkylene oxides and aliphatic alcohols, glycols, cyclic dehydration products of hexitols, alkyl-substituted phenols, aliphatic carboxylic acids, aliphatic amines, aliphatic diamines and amides. The condensation products have a molecular weight of at least 700, preferably of more than 1000. It is also possible to combine these sensitizers with each other as described in BE-P 537,278 and GB-P 727,982.

The silver halide emulsion may be sensitized panchromatically to ensure reproduction of all colors of the visible part of the spectrum or it may be orthochromatically sensitized.

The spectral photosensitivity of the silver halide can be adjusted by proper spectral sensitization by means of the usual mono- or polymethine dyes such as acidic or basic cyanines, hemicyanines, oxonols, hemioxonols, styryl dyes or others, also tri- or polynuclear methine dyes e.g. rhodacyanines or neocyanines. Such spectral sensitizers have been described by e.g. F. M. HAMER in "The Cyanine Dyes and Related Compounds" (1964) Interscience Publishers, John Wiley & Sons, New York.

The silver halide emulsions may contain the usual stabilizers e.g. azaindenes, preferably tetra- or penta-azaindenes, especially those substituted with hydroxy or amino groups. Compounds of this kind have been described by BIRR in Z. Wiss. Photogr. Photophys. Photochem. 47, 2–27 (1952). Other suitable stabilizers are i.a. heterocyclic mercapto compounds e.g. phenylmercaptotetrazole, quaternary benzothiazole derivatives, and benzotriazole.

A survey of photographic silver halide emulsions and their preparation is given in Research Disclosure December 1989, item 308119.

Processing of the image-wise exposed photographic silver halide emulsion layer proceeds whilst in contact with an image receiving material and is accomplished using an alkaline processing liquid having a pH preferably between 9 and 13. The pH of the alkaline processing liquid may be established using various alkaline substances. Suitable alkaline substances are inorganic alkali e.g. sodium hydroxide, potassium carbonate or alkanolamines or mixtures thereof. Preferably used alkanolamines are tertiary alkanolamines e.g. those described in EP-A 397925, EP-A 397926, EP-A 397927, EP-A 398435 and U.S. Pat. No. 4,632,896.

A combination of alkanolamines having both a $pK_a$ above or below 9 or a combination of alkanolamines whereof at least one has a $pK_a$ above 9 and another having a $pK_a$ of 9 or less may also be used as disclosed in the Japanese patent applications laid open to the public numbers 73949/61, 73953/61, 169841/61, 212670/60, 73950/61, 73952/61, 102644/61, 226647/63, 229453/63, U.S. Pat. No. 4,362,811, U.S. Pat. No. 4,568,634 etc. The concentration of these alkanolamines is preferably from 0.1 mol/l to 0.9 mol/l.

Suitable developing agents for the exposed silver halide are e.g. hydroquinone-type and 1-phenyl-3-pyrazolidone-type developing agents as well as p-monomethylaminophenol and derivatives thereof. Preferably used is a combination of a hydroquinone-type and 1-phenyl-3-pyrazolidone-type developing agent wherein the latter is preferably incorporated in one of the layers comprised on the support of the photographic material. A preferred class of 1-phenyl-3-pyrazolidone-type developing agents is disclosed in EP-A 449340.

Other type of developing agents suitable for use in accordance with the present invention are reductones e.g. ascorbic acid derivatives.

The developing agent or a mixture of developing agents can be present in an alkaline processing solution, in the photographic material or the image receiving material. In case the developing agent or a mixture of developing agents is contained in the photographic material and/or image receiving material, the processing solution can be merely an aqueous alkaline solution that initiates and activates the development.

In the DTR process the photographic element is developed in the presence of a silver halide solvent. Preferably used silver halide solvents are water soluble thiosulphate compounds such as ammonium and sodium thiosulphate, or ammonium and alkali metal thiocyanates. Other useful silver halide solvents (or "complexing agents") are described in the book "The Theory of the Photographic Process" edited by T. H. James, 4th edition, p. 474–475 (1977), in particular sulphites and uracil. Further interesting silver halide complexing agents are cyclic imides, preferably combined with alkanolamines, as described in U.S. Pat. No. 4,297,430 and U.S. Pat. No. 4,355,090. 2-mercaptobenzoic acid derivatives are described as silver halide solvents in U.S. Pat. No. 4,297,429, preferably combined with alkanolamines or with cyclic imides and alkanolamines. Dialkylmethylenedisulfones can also be used as silver halide solvent.

The silver halide solvent is preferably present in the processing solution but may also be present in one or more layers comprised on the support of the imaging element and/or receiving material.

The processing solution for use in the production of black-and-white photographs may comprise other additives such as e.g. thickeners, preservatives, detergents e.g. acetylenic detergents such as SURFYNOL 104, SURFYNOL 465, SURFYNOL 440 etc. all available from Air Reduction Chemical Company, New York.

The DTR-process is normally carried out at a temperature in the range of 10° C. to 35° C.

More details on the DTR-process can be found in "Photographic Silver Halide Diffusion Processes" by A. Rott and E. Weyde, Focal Press, London, New York (1972).

In accordance with a second photographic mode a color photograph in the form of one or more dye images is formed by the dye diffusion transfer process (dye DTR-process) wherein the imagewise transfer of dye(s) is controlled by the development of (a) photo-exposed silver halide emulsion layer(s), and wherein dye(s) is (are) transferred imagewise in a special image receiving layer, called mordant layer, for fixing the dyes.

Dye diffusion transfer reversal processes are based on the image-wise transfer of diffusible dye molecules from an image-wise exposed silver halide emulsion material into a waterpermeable image-receiving layer containing a mordant for the dye(s). The image-wise diffusion of the dye(s) is controlled by the development of one or more image-wise exposed silver halide emulsion layers, that for the production of a multicolor image are differently spectrally sensitized and contain respectively a yellow, magenta and cyan dye molecules. A survey of dye diffusion transfer imaging processes has been given by Christian C. Van de Sande in Angew. Chem. - Ed. Engl. 22 (1983) n° 3, 191–209 and a particularly useful process is described in U.S. Pat. No. 4,496,645.

For use in dye diffusion transfer photography the type of mordant chosen will depend upon the dye to be mordanted. If acid dyes are to be mordanted, the image-receiving layer being a dye-mordanting layer contains basic polymeric mordants such as polymers of amino-guanidine derivatives of vinyl methyl ketone such as described in U.S. Pat. No. 2,882,156, and basic polymeric mordants and derivatives, e.g. poly-4-vinylpyridine, the metho-p-toluene sulphonate of poly-2-vinylpyridine and similar compounds described in U.S. Pat. No. 2,484,430, and the compounds described in DE-A 2,009,498 and 2,200,063. Other mordants are long-chain quaternary ammonium or phosphonium compounds or ternary sulphonium compounds, e.g. those described in U.S. Pat. Nos. 3,271,147 and 3,271,148, and cetyltrimethylammonium bromide. Certain metal salts and their hydroxides that form sparingly soluble compounds with the acid dyes may be used too. The dye mordants are dispersed or molecularly divided in one of the usual hydrophilic binders in the image-receiving layer, e.g. in gelatin, polyvinylpyrrolidone or partly or completely hydrolysed cellulose esters.

In U.S. Pat. No. 4,186,014 cationic polymeric mordants are described that are particularly suited for fixing anionic dyes, e.g. sulphinic acid salt dyes that are image-wise released by a redox-reaction described e.g. in EP-A 004 399 and U.S. Pat. No. 4,232,107.

Further details about the black-and-white DTR process and also about the dye diffusion transfer process and image receiving materials used therein are described in Research Disclosure November 1976, item 15162.

In another preferred embodiment the optical information is applied on a hydrophilic layer coated on the support of the information carrier by printing. Suitable printing processes are e.g. planographic offset printing, gravure printing, intaglio printing, screen printing, flexographic printing, relief printing, tampon printing, ink jet printing, laser printing, thermal transfer printing, dye diffusion thermal transfer printing and toner-transfer printing from electro(photo) graphic recording materials.

In still another preferred embodiment the optical information is applied on the hydrophilic layer of the information carrier by a combination of a photographic method and a printing technique, both mentioned above.

The support of the information carrier, before or after being optionally coated with a hydrophilic colloid layer(s) for imaging purposes can receive itself or on said optional layer(s) security or verification marks in the form of e.g. a watermark, finger prints, printed patterns known from bank notes, coded information, e.g. binary code information, signature or other printed personal data or marks or continuous layers that may be applied with liquid crystals, fluorescent pigments, nacreous pigments giving special light-reflection effects, and/or visibly legible or ultraviolet-legible printing inks as described e.g. in GB-P 1,518,946 and U.S. Pat. No. 4,105,333.

After applying all the necessary information and/or security marks or layers on the laminating elements and/or on the information carrier the information carrier is laminated between the two laminating elements. Preferably the lamination is done by bringing the information carrier between the two laminating elements and by pressing them together in a laminator at a temperature of about 80° to 140° C. under a moderate pressure e.g. in the range of 0.2 to 1.5 kg/cm$^2$, keeping the elements to be laminated in pressure contact for a period of about 10 seconds.

According to a particular embodiment the two laminating elements are somewhat larger in size than the information carrier. Operating that way the information carrier is surrounded at the edges by a rim of protective laminating elements being homogeneously laminated together.

The following example illustrate the present invention without, however, limiting it thereto.

All parts, ratios and percentages are by weight unless otherwise stated.

EXAMPLE 1

Preparation of a laminating element comprising an inner and an outer layer and a fluorescent dye A DIN A 4 sheet of poly (ethylene terephthalate) with a thickness of 100 μm was printed homogeneously till 5 mm away from the edge with a printing ink containing compound 1 (compound according to formula I wherein $R^1$=$R^2$=H) dissolved in methylethylketone so that said sheet of poly (ethylene terephthalate) contained 1 g of compound 1 per m$^2$. On said sheet of poly (ethylene terephthalate) was glued a DIN A 4 sheet of polyethylene with a thickness of 100 μm with a two-component polyurethane glue.

Preparation of photographic element for use in the DTR process

A gelatino silver halide emulsion was prepared by slowly running with stirring an aqueous solution of 1 mole of silver nitrate per liter into a gelatine solution containing per mole of silver nitrate 41 g of gelatin, 1.2 mole of sodium chloride, 0.08 mole of potassium bromide and 0.01 mole of potassium iodide.

The temperature during precipitation and the subsequent ripening process lasting three hours was kept at 40° C.

Before cooling, shredding and washing 214 g of gelatin were added per mole of silver halide. The washed noodles were molten and another 476 g of gelatin were added per mole of silver halide during the chemical ripening. After ripening 285 g of gelatin in the form of a 20% aqueous solution were added to the emulsion per mole of silver halide as well as hydroquinone in an amount such that after coating 0.9 g of hydroquinone were present per m$^2$ and 1-phenyl-4,4-dimethyl-3-pyrazolidinone in an amount such that 0.21 g thereof were present per m$^2$. The emulsion was coated at one side of a subbed water-resistant paper support consisting of a paper having a weight of 110 g/m$^2$ coated at both sides with a polyethylene stratum at a ratio of 20 g/m$^2$ per side.

The emulsion was coated in such a way that an amount of silver equivalent to 1.5 g of silver nitrate was applied per $m^2$. The amount of gelatin corresponding therewith is 8.93 $g/m^2$ since the gelatin to silver nitrate weight ratio was 5.97.

Preparation of image receiving material for use in the DTR process

One side of a paper support having a weight of 100 $g/m^2$ being coated at both sides with a polyethylene layer of 20 $g/m^2$ was coated after corona treatment at a dry coverage of 2.5 $g/m^2$ of gelatin from the following coating composition:

| | | |
|---|---|---|
| carboxymethyl cellulose | 12 | g |
| gelatin | 38.5 | g |
| 3% aqueous dispersion of colloidal $Ag_2S.NiS$ nuclei | 14 | ml |
| 4% aqueous solution of formaldehyde | 12 | ml |
| 12.5% solution of saponine in ethanol/water (20/80) | 20 | ml |

DTR-image formation

The above defined photographic element was image-wise exposed in a reflex camera to obtain therein a photograph (portrait) of the passport owner.

The photo-exposed element was pre-moistened with a processing liquid as defined hereinafter.

The contact time of the photo-exposed element with said liquid was 6 seconds before being pressed together with the image-receiving material as defined above. The transfer processor employed was a COPYPROOF (registered trade name of AGFA-GEVAERT N.V.) type CP 380. The transfer contact time was 30 seconds. In the image-receiving layer a positive black-and-white (silver image) portrait of the photographed person was obtained.

Composition of the processing liquid:

| | | |
|---|---|---|
| hydroxyethyl cellulose | 1.0 | g |
| Ethylenediaminetetraacetic acid tetrasodium salt | 2.0 | g |
| $Na_2SO_3$ | 45.0 | g |
| $Na_2S_2O_3$ | 14.0 | g |
| KBr | 0.5 | g |
| 1-Phenyl-5-mercapto-tetrazole | 0.1 | g |
| 1-(3,4-Dichlorophenyl)-1H-tetrazole-5-thiol | 0.02 | g |
| N-methyl-ethanolamine | 45.0 | ml |
| N-methyl-diethanolamine | 30.0 | ml |
| Water up to | 1 | l |

Preparation of the security document

The DTR-image comprising element was placed between the laminating element comprising an inner and an outer sheet (the polyethylene sheet being the inner sheet) and a DIN A 4 laminating sheet of polyvinyl chloride with a thickness of 200 μm, the support of the DTR-image comprising element being contiguous to the polyethylene inner layer. The two laminating elements were laminated together in a roll laminator pressing successive areas of the laminating elements together for 10 seconds using a pressure of 0.5 $kg/cm^2$ at a temperature of 110° C.

When the side of the security document carrying the laminating layer comprising an inner and an outer sheet is exposed to daylight, the edge of said security document emits yellow light.

We claim:

1. A security document comprising (1) a laminate comprising two laminating elements serving as support and covering element and (2) an information carrier laminated between the laminating elements, at least one laminating element comprising two transparent or translucent plastic sheets serving as outer resin layer and inner resin layer characterized in that in the said at least one laminating element comprising an outer resin layer and an inner resin layer a fluorescent dye is located between said outer resin layer and said inner resin layer, said fluorescent dye giving light piping in said laminating element containing said fluorescent dye when irradiated with light having a wavelength between 200 and 1000 nm.

2. A security document according to claim 1, wherein said fluorescent dye correspond to the following structure:

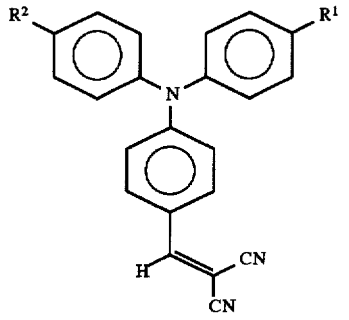

Formula I wherein $R^1$ and $R^2$ independently represent hydrogen, halogen, an alkyl group, an aryl group, an alkoxy group or a thioalkoxy group.

3. A security document according to claim 2, wherein $R^1$ and $R^2$ represent both hydrogen.

4. A security document according to claim 1 wherein said fluorescent dye is present in a coverage of 0.01 $g/m^2$ to 10 $g/m^2$.

5. A security document according to claim 1 wherein one laminating element is a single layer of an organic resin.

6. A security document according to claim 1 wherein said two laminating elements each comprise an outer resin layer and an inner resin layer and a fluorescent dye giving light piping in said laminating elements.

7. A security document according to claim 1 wherein said laminating element comprising two transparent or translucent plastic sheets serving as outer resin layer and as inner resin layer has a polyalkylene layer as inner resin layer.

8. A security document according to claim 1 comprising an information carrier comprising an opaque support and carrying information at only one side of said information carrier wherein said fluorescent dye is homogeneously present in the laminating element of said laminate which is applied at that side of the information carrier not carrying information.

9. A security document according to claim 1 wherein said fluorescent dye is present as a mark or marks only at spots not carrying specified security or verification marks.

10. A security document according to claim 1 wherein information on the information carrier is obtained by printing.

11. A security document according to claim 1 wherein information is applied on a hydrophilic colloid layer coated on a support of said information carrier, said hydrophilic colloid layer being an image receiving layer comprising a photographic image obtained by the silver complex diffusion transfer reversal process.

* * * * *